(12) United States Patent
Staub et al.

(10) Patent No.: US 11,119,019 B2
(45) Date of Patent: Sep. 14, 2021

(54) CUTTING FORCE ANALYSER

(71) Applicants: Tim Staub, Hamilton (NZ); ANAGO LIMITED, Hamilton (NZ)

(72) Inventors: Tim Staub, Hamilton (NZ); Peter Dowd, Hamilton (NZ)

(73) Assignee: ANAGO LIMITED

( * ) Notice: Subject to any disclaimer, the term of this patent is extended or adjusted under 35 U.S.C. 154(b) by 102 days.

(21) Appl. No.: 16/311,882

(22) PCT Filed: Jun. 16, 2017

(86) PCT No.: PCT/NZ2017/050083
§ 371 (c)(1),
(2) Date: Dec. 20, 2018

(87) PCT Pub. No.: WO2017/222394
PCT Pub. Date: Dec. 28, 2017

(65) Prior Publication Data
US 2019/0204195 A1  Jul. 4, 2019

(30) Foreign Application Priority Data
Jun. 20, 2016 (NZ) ........................................ 721367

(51) Int. Cl.
| | | |
|---|---|---|
| G01N 3/58 | (2006.01) | |
| A22C 17/00 | (2006.01) | |
| B26D 5/00 | (2006.01) | |
| G01G 19/50 | (2006.01) | |
| G01G 23/16 | (2006.01) | |
| G01L 5/00 | (2006.01) | |
| G05B 19/4065 | (2006.01) | |
| G01B 5/28 | (2006.01) | |
| G01N 21/91 | (2006.01) | |
| B23Q 17/09 | (2006.01) | |

(52) U.S. Cl.
CPC ........... *G01N 3/58* (2013.01); *A22C 17/0013* (2013.01); *B23Q 17/09* (2013.01); *B26D 5/00* (2013.01); *G01B 5/28* (2013.01); *G01G 19/50* (2013.01); *G01G 23/163* (2013.01); *G01L 5/0038* (2013.01); *G01N 21/91* (2013.01); *G05B 19/4065* (2013.01)

(58) Field of Classification Search
CPC .......... G01N 21/91; G01N 3/58; B23Q 17/09; G05B 19/4065; G01L 3/28
USPC .......................................................... 73/104
See application file for complete search history.

(56) References Cited

U.S. PATENT DOCUMENTS

| | | | | |
|---|---|---|---|---|
| 2,782,574 A | * | 2/1957 | Copold ................ | B25B 11/005 |
| | | | | 451/388 |
| 3,640,130 A | * | 2/1972 | Spescha .................. | B23Q 1/34 |
| | | | | 73/862.043 |

(Continued)

*Primary Examiner* — Clayton E. LaBalle
*Assistant Examiner* — Kevin C Butler
(74) *Attorney, Agent, or Firm* — Hulsey P.C.

(57) ABSTRACT

A cutting force analyser is provided, comprising weighing means adapted to determine the weight of an object and force applied to the object; a record of a force threshold for cutting the object; and indicating means. The analyser is formed to use the weighing means to differentiate between the weight of the object and cutting force applied to it, to compare the cutting force with the force threshold, and to use the indicating means to communicate how the force compares with the threshold.

11 Claims, 3 Drawing Sheets

(56) References Cited

U.S. PATENT DOCUMENTS

Figure 1:
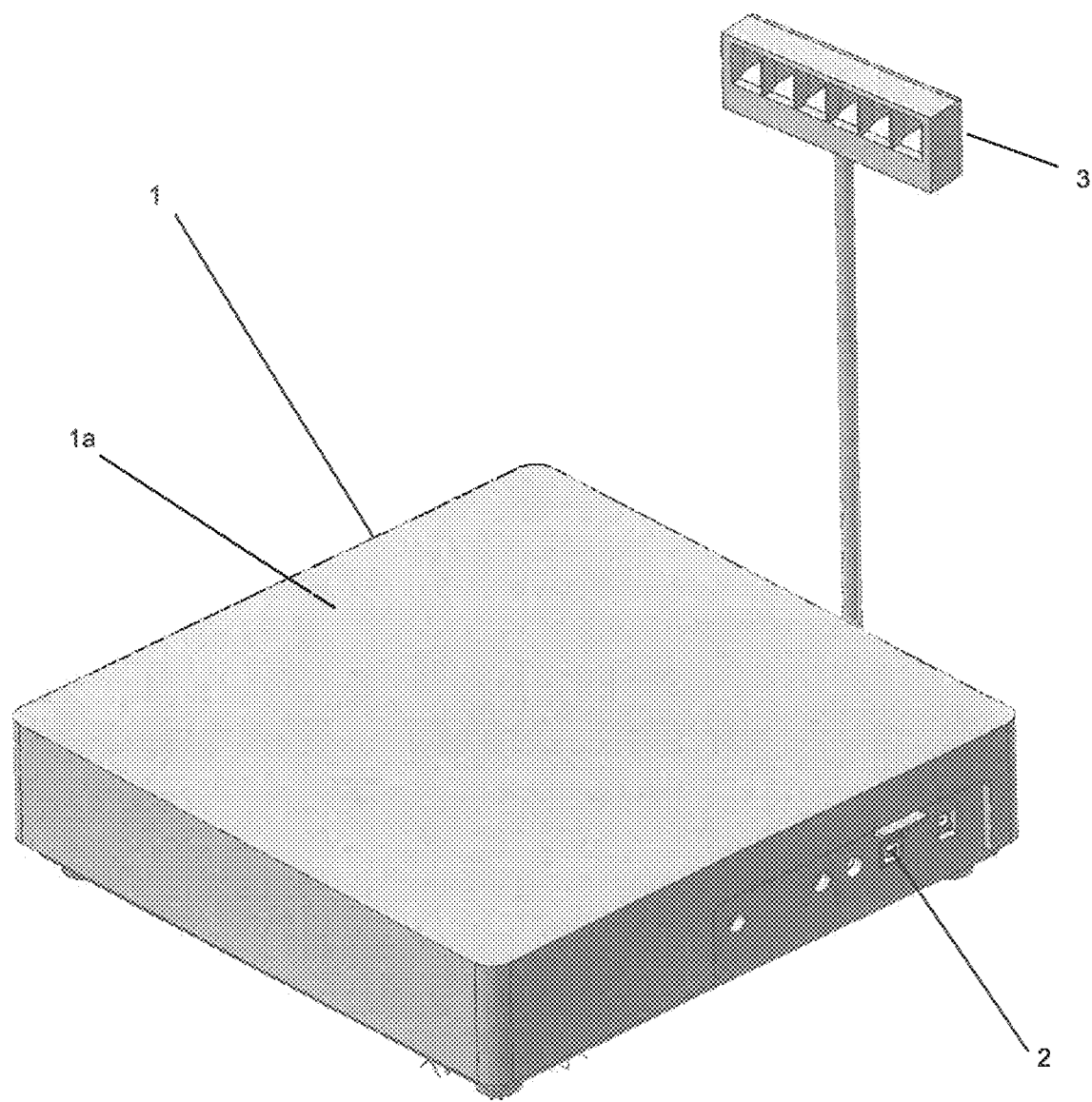

| | | | | |
|---|---|---|---|---|
| 3,939,704 | A * | 2/1976 | Zipin | G01L 5/164 |
| | | | | 73/862.041 |
| 4,259,863 | A * | 4/1981 | Rieck | G01L 1/14 |
| | | | | 73/862.041 |
| 4,398,429 | A * | 8/1983 | Cook | G01G 19/44 |
| | | | | 600/595 |
| 4,653,361 | A * | 3/1987 | Zobeli | B23D 59/001 |
| | | | | 125/14 |
| 5,400,661 | A * | 3/1995 | Cook | G01L 5/164 |
| | | | | 73/862.041 |
| 5,487,536 | A * | 1/1996 | McEachin | B25B 11/005 |
| | | | | 269/21 |
| 6,359,239 | B1 * | 3/2002 | Missler | A47J 47/005 |
| | | | | 177/177 |
| 6,508,137 | B2 * | 1/2003 | Suzuki | G06F 3/0338 |
| | | | | 73/862.043 |
| 6,823,744 | B2 * | 11/2004 | Ohsato | G01L 5/162 |
| | | | | 73/862.041 |
| 6,915,709 | B2 * | 7/2005 | Okada | G01L 5/165 |
| | | | | 73/862.041 |
| 7,059,202 | B2 * | 6/2006 | Stanos | G01L 5/0033 |
| | | | | 73/862.043 |
| 7,158,915 | B2 * | 1/2007 | Wargon | G01B 11/00 |
| | | | | 702/156 |
| 7,905,155 | B2 * | 3/2011 | Wong | G01M 7/022 |
| | | | | 73/865.6 |
| 9,459,173 | B2 * | 10/2016 | White | A61B 5/4023 |
| 2014/0165803 | A1 * | 6/2014 | Kuhmichel | G01L 1/22 |
| | | | | 83/13 |

\* cited by examiner

CUTTING FORCE ANALYSER

FIELD OF INVENTION

The invention relates to the field of analysing force applied while cutting a product and in particular to providing visual or aural feedback to workers cutting products.

BACKGROUND

There are many situations where people cut various types of products repeatedly. For example, workers in a supermarket may cut vegetables into portions for packaging and sale. Pumpkins, cabbage and cauliflower may be cut down into half or less to be sold as smaller portions to customers who do not want a whole vegetable. Another industry where product cutting is important is in the preparation of meat and meat products for sale.

Workers in these industries and other industries may perform the same task repeatedly during a work shift. While performing these tasks the workers have no way of knowing if their cutting technique is optimal or their tools need sharpening.

It is the object of a preferred embodiment of the present invention to provide a cutting force analyser. However, it should be appreciated that the invention has more general application, and so any objects or advantages applicable to the preferred embodiment should not be seen as a limitation on the scope of the claims. The object of the invention per se is simply to provide the public with a useful choice.

The term "comprising", if and when used in this document, should be interpreted non-exclusively. For example, if used in relation to a combination of features it should not be taken as precluding the option of there being further unnamed features.

SUMMARY OF THE INVENTION

In broad terms in one aspect the invention comprises a cutting force analyser, comprising:
  weighing means adapted to determine the weight of an object and force applied to the object;
  a record of a force threshold for cutting the object; and indicating means;
  the analyser formed to use the weighing means to differentiate between the weight of the object and cutting force applied to it, to compare the cutting force with the force threshold, and to use the indicating means to communicate how the force compares with the threshold.

Optionally the indicating means communicate a visual indication of how the forces compares with the threshold.

Optionally the indicating means comprise a plurality of lights.

Optionally the weighing means includes a scale.

Optionally the weighing means includes a load cell.

Optionally the weighing means includes a hook.

Optionally the cutting force analyser includes one or more clamps.

Optionally the cutting force analyser includes a record of different blades.

Optionally the record of force threshold for cutting an object is stored electronically.

In broad terms in another aspect the invention comprises a method of providing feedback using a cutting force analyser comprising the steps of:

accessing product information about a type of product and a force threshold for the product from the record;
receiving information from the weighing means about force applied to the product;
determining whether the force exceeds the force threshold by comparing force information to the force threshold; and
using the indicating means to provide feedback based on the force and the force threshold.

Optionally the feedback is visual feedback.

Optionally the force information is stored on a computing device.

Optionally the method further includes the step of timing out if no products are detected by the force measuring device for a predetermined length of time.

Optionally the visual feedback includes a number of lights.

Optionally the lights are coloured and the colour of the lights may change as the force applied to a product is closer to the threshold value.

Optionally the cutting force analyser is used to determine the force used to cut meat.

Optionally the cutting force analyser is used to determine the force used to cut fruit.

Optionally the cutting force analyser is used to determine the force used to cut vegetables.

DRAWINGS

Figure 2:
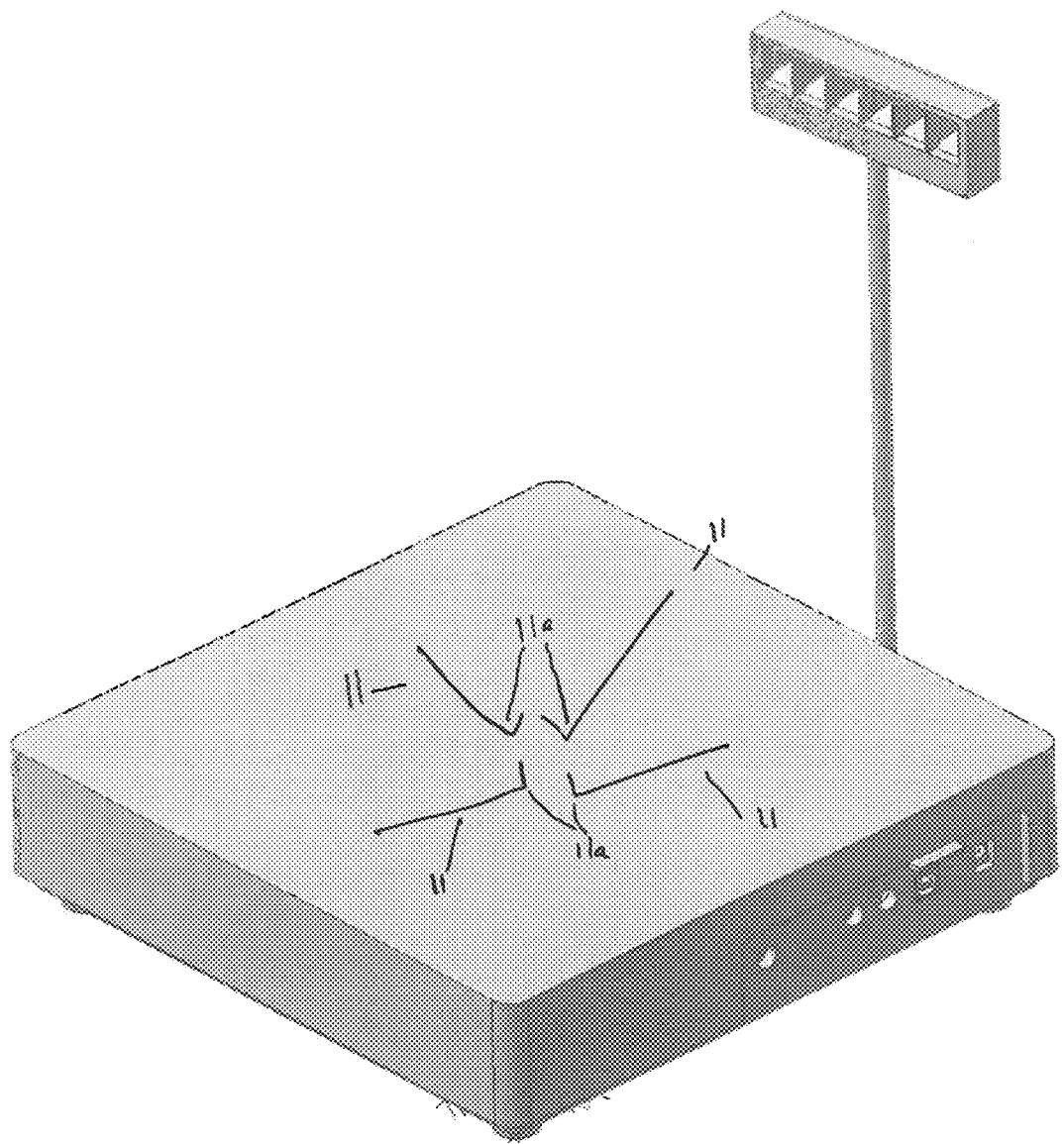
Figure 3:
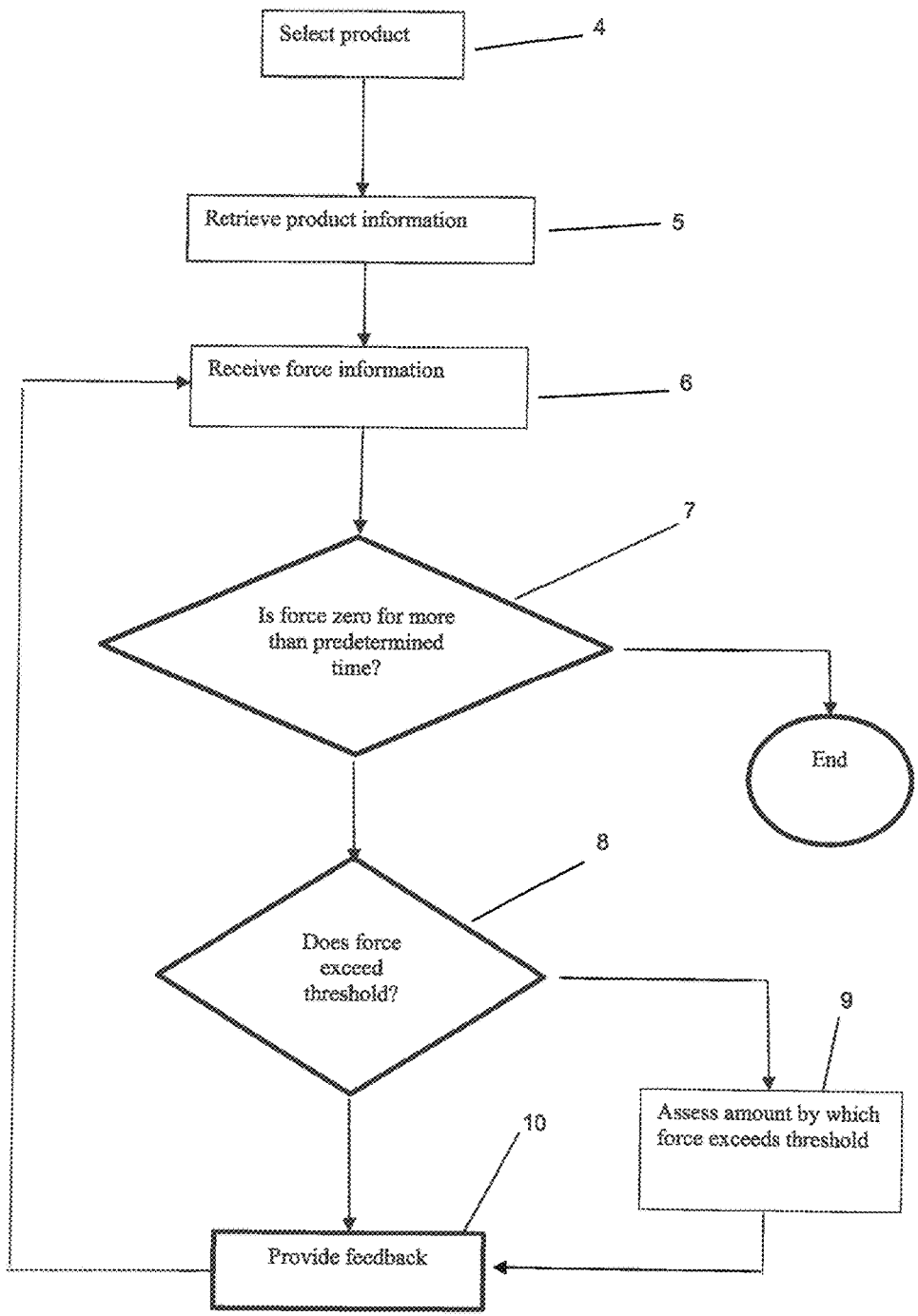

Some preferred embodiments of the invention will be further described with reference to the accompanying drawings in which:
  FIG. 1 shows scales that may be used in an embodiment of the invention;
  FIG. 2 shows clamps on the scale; and
  FIG. 3 is a flow chart.

DETAILED DESCRIPTION

FIG. 1 shows a set of scales that may be used by a worker/user cutting a product, for example, meat, fruit or vegetables. The scale 1 has one or more load cells under a plate 1a on which the product is placed. The load cell(s) measure the force on the plate. The weight of the product itself will apply some force to the load cell(s) due to gravity. As the worker cuts the product more force is applied to the load cell(s). This is because a knife or the like generally moves downwards through the product, and therefore exerts a force on the plate 1a. The generally downwards force is measured by the load cells. This may or may not be the entire force applied to the product. It will be understood that this measured downwards force is the cutting force or force for the purposes of this invention. This force is measured by the load cell(s) and the measurement sent to an electronic processor that assesses whether or not the force exceeds a predetermined threshold. Threshold values are stored for different products to be cut on plate 1a. These values are related to the upper force that may be needed to cut the product in an ideal situation. The scales may also include an output port to send force information to an attached computing device. Alternatively, the scales may communicate wirelessly with a computing device. Alternatively, the scales may have an on-board computing device.

In some embodiments, one or more clamps are provided to hold the product on the scales so it does not move more than is acceptable while being cut. For example, it prevents the product rolling whilst being cut and undesirably influencing the readings. The clamps may be any suitable form. For example, a spike on which the product is impaled or a device that cradles the product on the scales.

FIG. 2 shows an embodiment of clamps that may be used on the scales. The clamps 11 are V-shaped, pivoted at the bottom of the V 11a with one shorter arm and one longer arm. The V-shaped parts are spaced around the scale with the sorter arms towards the centre. A product is placed on the shorter arms, pivoting them downwards towards the centre of the scale. The longer arms move towards an upright position and help hold the produce in place. In example shown in FIG. 2, there are four V-shaped parts provided with the pivot points about 15 cm apart.

When a product is being cut on the scales the force information obtained is compared to force threshold information for the product being cut. Feedback information is provided to the worker. In one embodiment feedback information is provided by a series of lights 3 on the scales. Light box 3 has six different lights. As force is applied to the product as a result of cutting it with a knife the lights light up providing an indication of the magnitude of the force. If the force applied within expected limits (i.e. below the threshold), then the lights may all be green. If the force applied is near the top of the expected limits one or more of the lights may show orange. If the force applied exceeds a threshold, then one or more of the lights may show red. In one embodiment, the lights change from green to orange to red as the force applied by the worker cutting the product goes from within the limits to close to the threshold and then over the threshold. The change in lights allows the worker to relate the force they are applying to the threshold.

As the worker cuts the product force readings are continuously taken by the load cell(s). The force readings are compared to the threshold information and feedback is provided to the worker. This feedback allows the worker to see (or hear) if the force applied is too great so that the worker may adjust their cutting technique during cutting the product, or sharpen or replace the blade used and see (or hear) the results of the change. The feedback is effectively instantaneous.

The force threshold is dependent on the product being cut and the sharpness of the knife. For example, a potato cut with a sharp knife may require a maximum 500 g of force. A potato cut with a dull knife may require up to 2 kg of force. Further, cutting a potato with a dull knife may damage cells of the potato at the site of the cut leading to browning and a reduced shelf life. If the threshold for cutting potatoes is set at 500 g or slightly above 500 g, a worker will be provided with a visual or aural indication when the force exceeds this amount and may go and sharpen his or her knife before cutting the next potato. The worker should then find that the force no longer exceeds the threshold.

In another example, the force measuring device can measure force on a product that is hanging below the device. For example, meat may be hung from hooks are attached to load cells that measure the amount of force on the hooks. The load cells measure the weight of the meat and any generally downwards force applied to the meat during cutting. Feedback on cutting force is provided to the worker as they are cutting the meat to allow them to adjust their technique or alert them that their blade may require sharpening or replacing.

In other embodiments, different indicators may be used. The indicators could be visual, for example a numerical force reading or audible or a combination of visual and audible indicators.

FIG. 3 is a flow chart showing one embodiment of steps used in the method. In step 4 the worker or worker selects the product that is going to be cut. Each product will have its own threshold value(s) stored. The threshold value relates to the upper expected cutting force for the product. For example, cutting a lettuce will require less force than cutting a pumpkin and will accordingly have a lower threshold value than the pumpkin threshold value. The product selection may be made from a picklist (or other type of list) on the scales or on an associated computing device. For example, the worker could choose the type of product from a visual representation of different products shown on a screen associated with the scales and in communication with a computing device.

After the worker has selected the product, in step 5, product information is retrieved by the computing device from suitable storage. The product information includes a force threshold related to the maximum expected force required for cutting the product. Other product information may be stored as well.

Information on different types of knives and other cutting tools may also be stored. This means that it is possible to store force threshold information for a single product when different blades are used in cutting the product. If force threshold information relating to different blades is stored then the worker can select the blade they are using as well as selecting the product to be cut. The blade information may be based on blade length and weight and/or blade manufacturer.

When the first product is placed on the scales the force on the load cell(s) is sensed. This initial force relates to the weight of the product. The force will increase as the worker begins to cut the product. In step 6 the force information is periodically recorded at predetermined intervals.

In step 7 the question is asked 'is the force zero for more than a predetermined time?'. Asking this can allow the system to determine whether the cutting session has finished. For example, there will be a time when the force is zero after one product is removed from the scales and before another product is placed on the scales. This zero force period is to be expected. However, if there is no force applied to the scales for a longer period of time then the computing device may time out and end the session. Additionally or alternatively, a worker may be able to end the session, for example, by selecting 'end' on the computing device.

The force applied to the product is compared to a threshold value stored for the product and feedback is provided in step 10. This force is the difference between the force on the load cell(s) when the product is being cut and the force on the load cell(s) of the product by itself. The feedback may be lighting indicators to show that the applied force is less than the threshold or some other visual or audible means. In one embodiment if the force applied is less than the threshold value then a number of lights are lit green. If the force is close to the threshold value, then one or more of the lights may be lit orange. If the force exceeds the threshold value, then one or more of the lights may be lit red. The light sequence may change from all green to one orange and the remainder green, through to all orange, then one red and the rest orange through to all red. This gradual change in colour of the indicator lights provides feedback to the worker about the amount of force they are applying, and if the lights start turning red, the amount by which the force exceeds the threshold. This may indicate to the worker that their tools need sharpening or replacing or that their technique needs improving. If the force exceeds the threshold during cutting of a number of products in succession an alert may be provided to the worker to advise them to sharpen their tools.

The product is removed from the scales after the worker has finished cutting it. Another product may then be placed on the scales for cutting. If the product is the same type as the previous product the worker can start cutting it. The worker will need to select the type of product if it is different to the previous product. The session will continue until the worker ends it or it times out after a predetermined period with no items present on the scales.

The force information for a session may be stored on the computing device. Storing the force information allows the computing device to further process the information. For example, if the force applied to the product during the session regularly exceeded the threshold value this could indicate that the tool or tools used by the worker require sharpening or the worker's technique could be improved. If the force is gradually increasing over time, this could be used to predict when the worker's tools will need sharpening. This information can be provided to the worker. Additionally, force information could be used to assess if the produce is outside of the expected standard. For example, if the worker is cutting over-ripe fruit less force would be needed than if the worker were cutting unripe fruit. If the product is a fruit or vegetables that are unripe more force may be needed than if the fruit or vegetables are ripe. The average amount of force used by the worker could therefore be used as an indicator of a property of the produce (such as ripeness).

If the scale has more than one load cell, force information from each load cell may be sent to the computing device. Force information from more than one load cell can be analysed and may provide information about the worker's cutting technique. This information could allow the worker to optimise their cutting technique, minimise cutting effort, optimise processing time, and optimise product quality and optimise tool design, use and maintenance.

Although the examples given relate to produce, application of the process is much wider and the examples should not be seen as limiting.

While some preferred aspects of the invention have been described by way of example it should be appreciated that modifications and improvements can occur without departing from the scope of the following claims.

The invention claimed is:

1. A cutting force analyser, comprising:
   weighing means adapted to determine the weight of an object and force applied to the object as it is cut by a knife;
   a record of a force threshold for cutting the object with the knife; and
   indicating means;
   the analyser formed to use the weighing means to differentiate between the weight of the object and cutting force applied to it by the knife while cutting the object, to compare the cutting force with the force threshold, and to use the indicating means to communicate how the force compares with the threshold, the indicating means arranged to give a human operator real time signals while the knife is cutting, the analyser being such that different signals indicate:
   when the cutting force is below the threshold; and
   when the cutting force has at least reached the threshold and further,
   wherein said signals comprise different coloured lights.

2. A cutting force analyser according to claim 1, wherein the indicating means is formed to give the human operator a different instantaneous signal when the cutting force is approaching the threshold.

3. A cutting force analyser according to claim 1, which keeps a data record of different force thresholds and associates these with different objects and is formed such that a different threshold is used for the comparison referred to in claim 1 when a different object is selected.

4. A cutting force analyser according to claim 3, which keeps a data record of knife types and associates these with the different thresholds and objects and is formed such that a different threshold is used for the comparison when a different knife type and different object is selected.

5. A cutting force analyser according to claim 1, comprising a load cell arranged to determine the weight of the object to be cut as well as the force applied to the object by the knife.

6. A cutting force analyser according to claim 1, comprising clamps to hold the object referred to in claim 1, when it is cut, each clamp having a longer arm and a shorter arm in generally 'V' formation, the shorter arm being inside the longer arm and the arms arranged to pivot inwards when the object is placed on the shorter arm such that the longer arm presses against the object.

7. A cutting force analyser according to claim 1, wherein:
   the indicating means is formed to give the human operator a different instantaneous signal when the cutting force is approaching the threshold;
   the signals comprise different coloured lights;
   the force analyser has a data record of different force thresholds and associates these with different objects, and is formed such that a different threshold is used for the comparison referred to in claim 1 when a different object is selected;
   the force analyser has a data record of knife types and associates these with the different thresholds and objects, and is formed such that a different threshold is used for the comparison when a different knife type and different object is selected;
   the force analyser has a load cell arranged to determine the weight of the object to be cut as well as the force applied to the object by the knife; and
   the force analyser has clamps to hold the object when it is cut, each clamp having a longer arm and a shorter arm in generally 'V' formation, the shorter arm being inside the longer arm and the arms arranged to pivot inwards when the object is placed on the shorter arm such that the longer arm presses against the object.

8. A method of assessing a knife, wherein:
   a cutting force analyser according to claim 1 is used to determine the cutting force applied to an object by a knife while cutting the object; and
   a 'has at least reached the threshold' signal issued by the indicating means during cutting is used to determine that the knife needs sharpening.

9. A method according to claim 8, wherein a record of force threshold for the object being cut is dependent on the object and/or the type of knife used for the cutting.

10. A method of assessing human cutting technique wherein:
   a cutting force analyser according to claim 1 is used to determine the cutting force applied to an object by a knife while cutting the object; and
   a 'has at least reached the threshold' signal issued by the indicating means during cutting is used to determine that the operator should improve cutting technique.

11. A method according to claim 10, wherein a record of force threshold for the object being cut is dependent on the object and/or the type of knife used for the cutting.

\* \* \* \* \*